United States Patent
Sorensen et al.

(10) Patent No.: US 6,557,602 B1
(45) Date of Patent: May 6, 2003

(54) ENCLOSED WET SAW TABLE

(76) Inventors: Le Roy S. Sorensen, deceased, late of Neptune City, NJ (US); by Clara Sorensen, heir, 933 4th Ave., Neptune City, NJ (US) 07753

( * ) Notice: Subject to any disclaimer, the term of this patent is extended or adjusted under 35 U.S.C. 154(b) by 0 days.

(21) Appl. No.: 09/957,725

(22) Filed: Sep. 21, 2001

(51) Int. Cl.[7] .................................................. B25H 1/00
(52) U.S. Cl. ..................... 144/286.5; 83/98; 144/286.1; 409/253; 451/453
(58) Field of Search ........................... 83/98, 100, 104; 144/286.1, 286.5, 252.1, 251.1, 252.2; 409/253; 451/451, 453, 456, 457; 29/DIG. 94, DIG. 102

(56) References Cited

U.S. PATENT DOCUMENTS

| | | |
|---|---|---|
| 3,844,269 A | 10/1974 | Rater |
| 4,408,642 A * | 10/1983 | Jeruzal et al. ........... 144/286.5 |
| 4,423,568 A | 1/1984 | Gould |
| 4,484,845 A | 11/1984 | Pennella et al. |
| 4,779,603 A | 10/1988 | Crocetti |
| D325,035 S | 3/1992 | Sparks |
| 5,577,955 A | 11/1996 | Voege |
| 5,582,225 A * | 12/1996 | Schank ..................... 144/286.1 |
| 5,882,155 A | 3/1999 | Testa |

* cited by examiner

*Primary Examiner*—W. Donald Bray

(57) ABSTRACT

An enclosed wet saw table for containing debris distributed by a wet type table saw. The enclosed wet saw table includes a table apparatus with a sink section for placing a wet saw on. There are walls on three sides of the sink for containing any splashing of liquid and debris during the cutting process. The liquid and debris drains through into a container having a pump member for filtering and re-circulating the liquid back up to the wet saw. All of the sections of the table apparatus are selectively couplable allowing the user to transport the unit and set it up on site in short order.

19 Claims, 4 Drawing Sheets

ENCLOSED WET SAW TABLE

BACKGROUND OF THE INVENTION

1. Field of the Invention

The present invention relates to saw tables and more particularly pertains to a new enclosed wet saw table for containing debris distributed by a wet type table saw.

2. Description of the Prior Art

The use of saw tables is known in the prior art. More specifically, saw tables heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,882,155; 3,884,269; 4,779,603; 5,577,955; 4,484,845; 4,423,568; and U.S. Pat. No. Des. 325,035.

While these devices fulfill their respective, particular objectives and requirements, the aforementioned patents do not disclose a new enclosed wet saw table. The inventive device includes a table apparatus with a sink section for placing a wet saw on. There are walls on three sides of the sink for containing any splashing of liquid and debris during the cutting process. The liquid and debris drains through into a container having a pump member for filtering and re-circulating the liquid back up to the wet saw. All of the sections of the table apparatus are selectively couplable allowing the user to transport the unit and set it up on site in short order.

In these respects, the enclosed wet saw table according to the present invention substantially departs from the conventional concepts and designs of the prior art, and in so doing provides an apparatus primarily developed for the purpose of containing debris distributed by a wet type table saw.

SUMMARY OF THE INVENTION

In view of the foregoing disadvantages inherent in the known types of saw tables now present in the prior art, the present invention provides a new enclosed wet saw table construction wherein the same can be utilized for containing debris distributed by a wet type table saw.

The general purpose of the present invention, which will be described subsequently in greater detail, is to provide a new enclosed wet saw table apparatus and method which has many of the advantages of the saw tables mentioned heretofore and many novel features that result in a new enclosed wet saw table which is not anticipated, rendered obvious, suggested, or even implied by any of the prior art saw tables, either alone or in any combination thereof.

To attain this, the present invention generally comprises a table apparatus with a sink section for placing a wet saw on. There are walls on three sides of the sink for containing any splashing of liquid and debris during the cutting process. The liquid and debris drains through into a container having a pump member for filtering and re-circulating the liquid back up to the wet saw. All of the sections of the table apparatus are selectively couplable allowing the user to transport the unit and set it up on site in short order.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new enclosed wet saw table apparatus and method which has many of the advantages of the saw tables mentioned heretofore and many novel features that result in a new enclosed wet saw table which is not anticipated, rendered obvious, suggested, or even implied by any of the prior art saw tables, either alone or in any combination thereof.

It is another object of the present invention to provide a new enclosed wet saw table which may be easily and efficiently manufactured and marketed.

It is a further object of the present invention to provide a new enclosed wet saw table which is of a durable and reliable construction.

An even further object of the present invention is to provide a new enclosed wet saw table which is susceptible of a low cost of manufacture with regard to both materials and labor, and which accordingly is then susceptible of low prices of sale to the consuming public, thereby making such enclosed wet saw table economically available to the buying public.

Still yet another object of the present invention is to provide a new enclosed wet saw table which provides in the apparatuses and methods of the prior art some of the advantages thereof, while simultaneously overcoming some of the disadvantages normally associated therewith.

Still another object of the present invention is to provide a new enclosed wet saw table for containing debris distributed by a wet type table saw.

Yet another object of the present invention is to provide a new enclosed wet saw table which includes a table apparatus with a sink section for placing a wet saw on. There are walls on three sides of the sink for containing any splashing of liquid and debris during the cutting process. The liquid and debris drains through into a container having a pump member for filtering and re-circulating the liquid back up to the wet saw. All of the sections of the table apparatus are selectively couplable allowing the user to transport the unit and set it up on site in short order.

Still yet another object of the present invention is to provide a new enclosed wet saw table that can be transported and assembled on site in a short amount of time.

Even still another object of the present invention is to provide a new enclosed wet saw table that can be utilized in established areas without damaging surrounding walls or flooring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
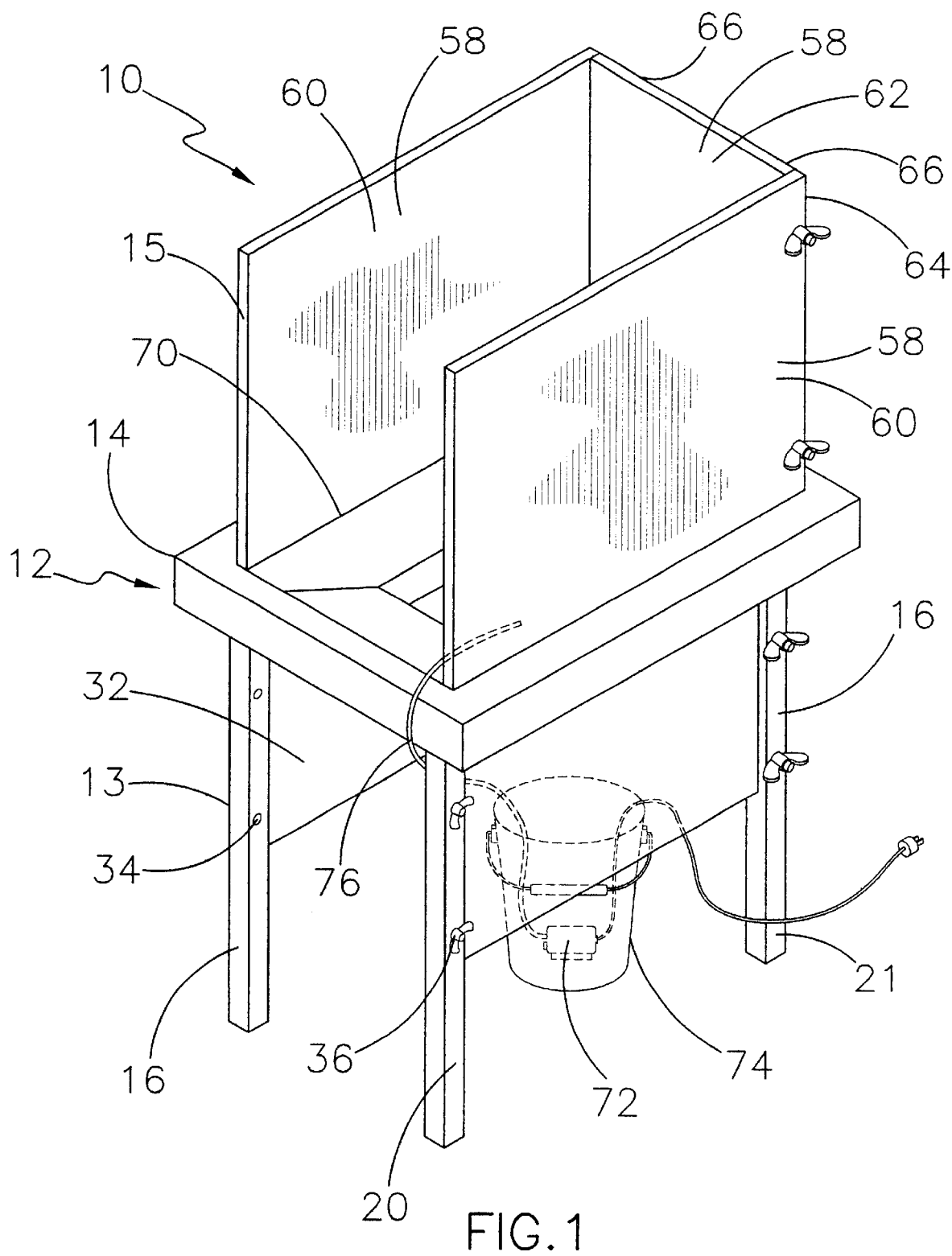
FIG. 1 is a perspective view of a new enclosed wet saw table according to the present invention.
Figure 2:
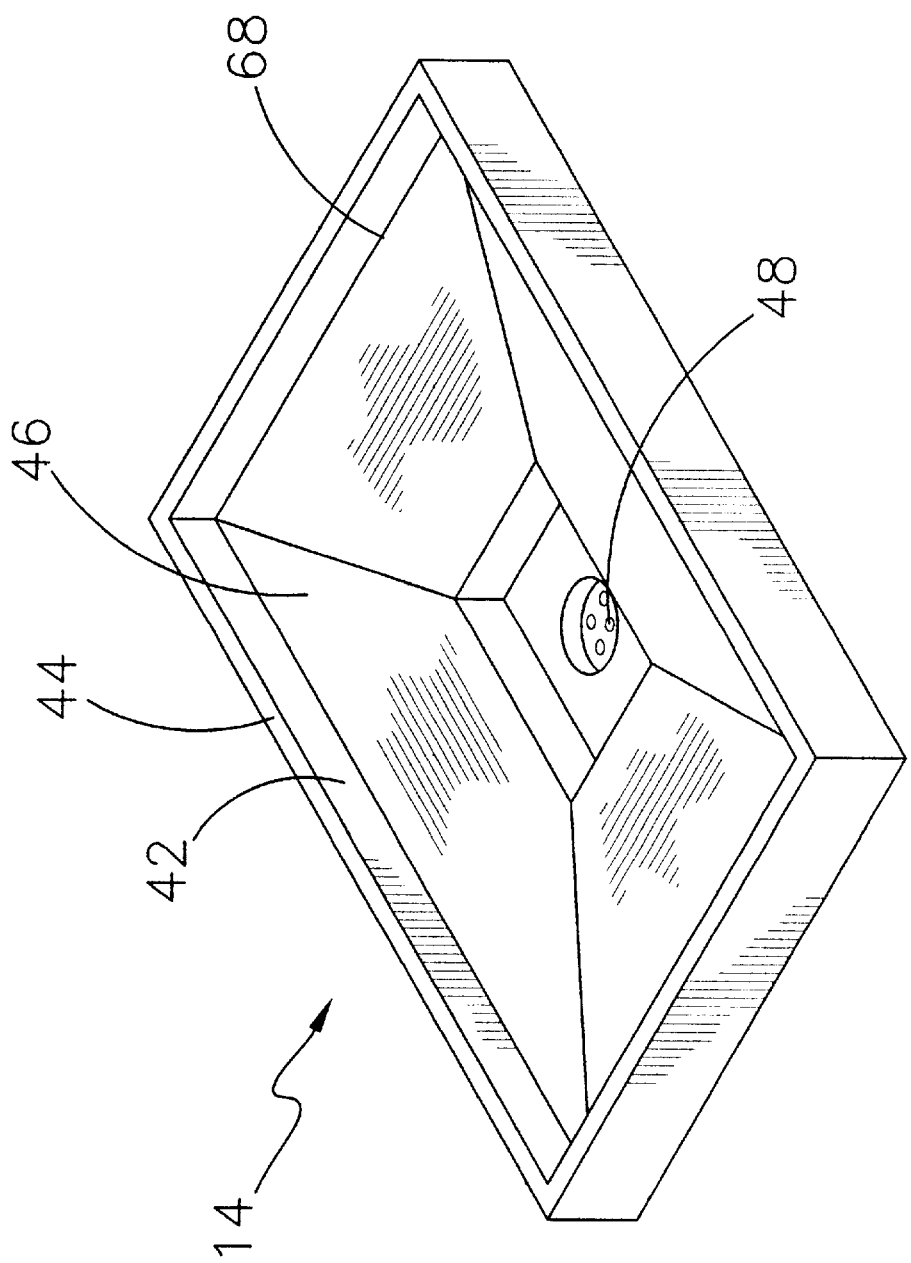
FIG. 2 is a perspective view of the sink section of the present invention.
Figure 3:
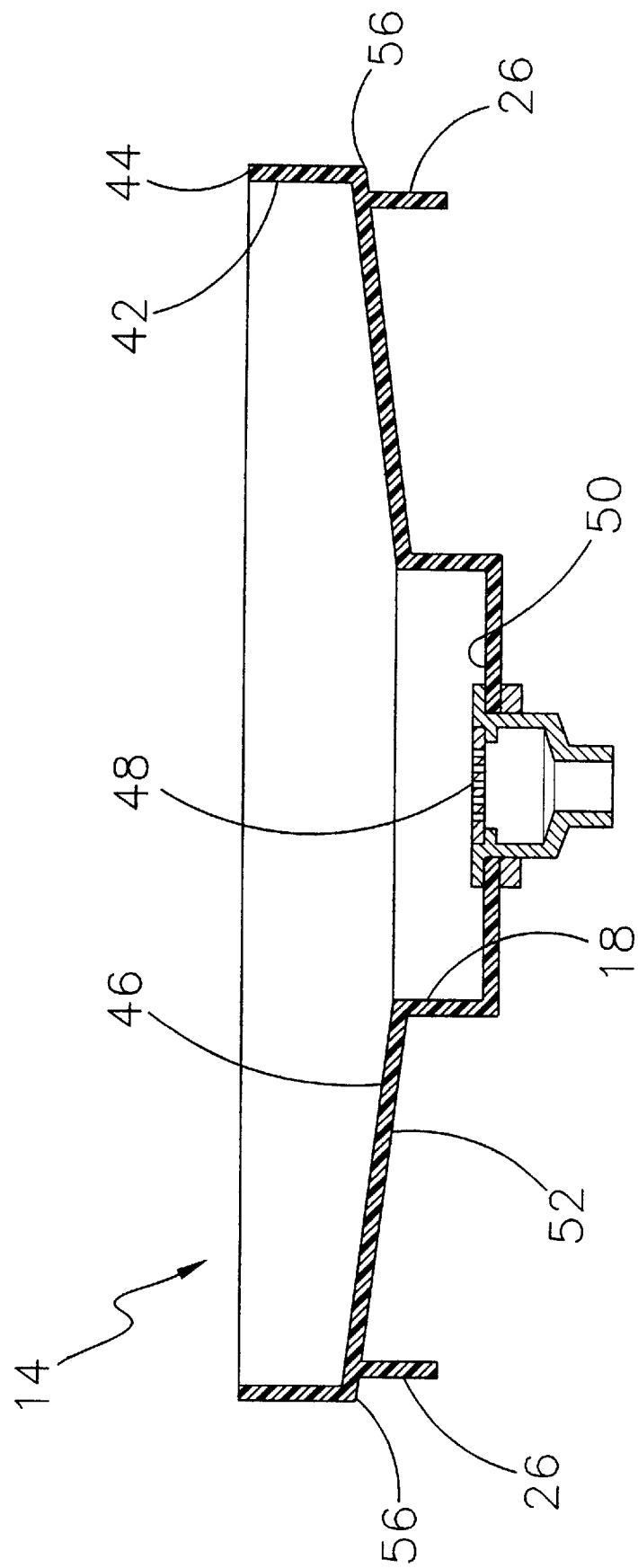
FIG. 3 is a cross-sectional view of the sink section of the present invention.
Figure 4:
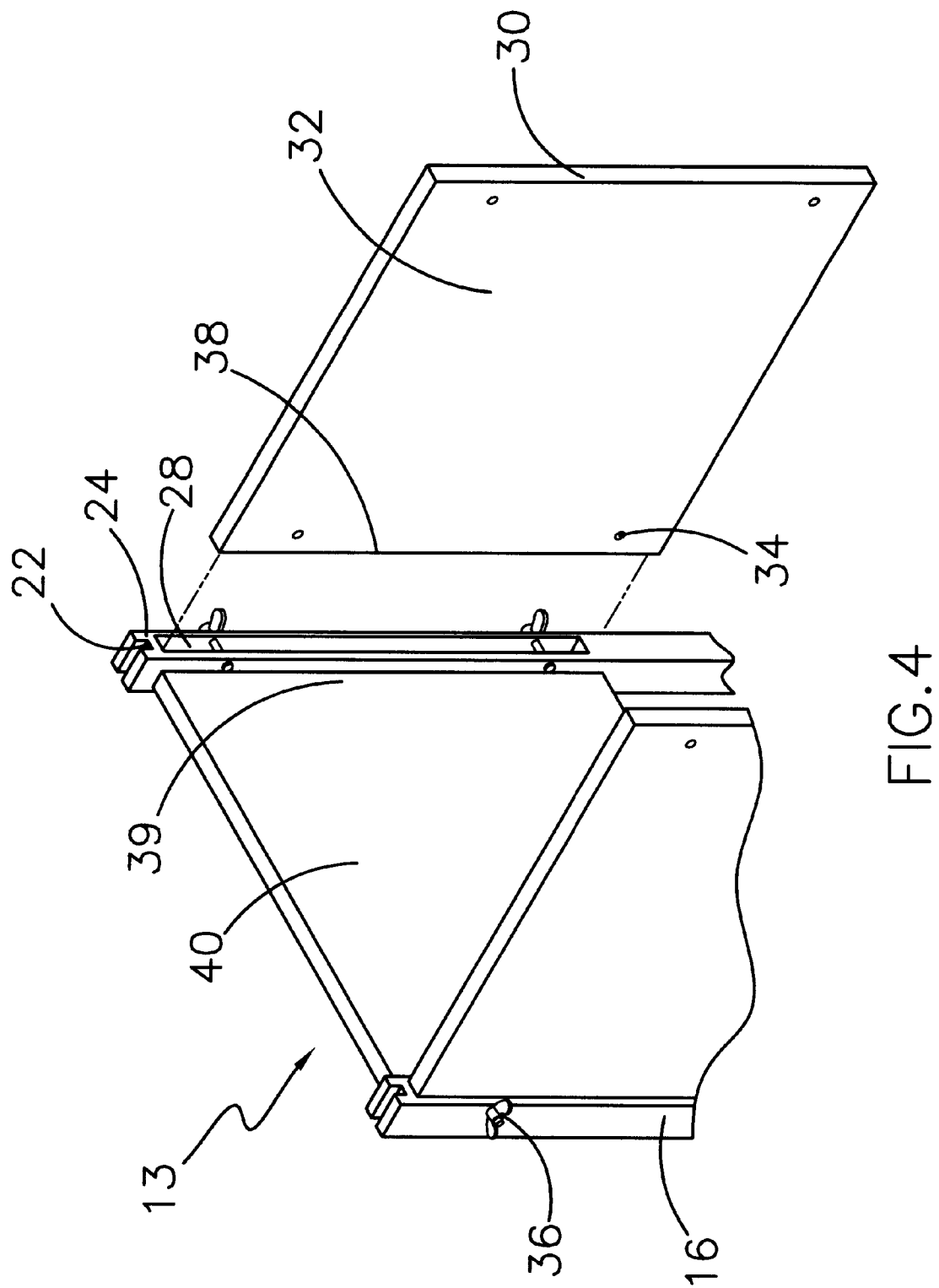
FIG. 4 is a partial exploded view of the base section of the present invention.

With reference now to the drawings, and in particular to FIGS. 1 through 4 thereof, a new enclosed wet saw table embodying the principles and concepts of the present invention and generally designated by the reference numeral 10 will be described.

As best illustrated in FIGS. 1 through 4, the enclosed wet saw table 10 generally comprises a table apparatus 12. The table apparatus 12 comprises a base section 14, a sink section 16, and a splash section 15. The base section 14 of the table apparatus 12 has a plurality of leg members 16. The leg members 16 are designed for supporting the table apparatus 12.

The sink section 16 of the table apparatus 12 is positioned atop the leg members 16. The sink section 16 is designed for capturing liquid and debris distributed from a wet table saw against the splash sections 18 of the table apparatus 12. The liquid and debris is then channeled downwardly through a drain portion 18 of the sink section 16 when the wet table saw is placed and operated on the sink section 16 of the table apparatus 12.

The plurality of leg members 16 of the base section 14 comprises front leg members 20 and rear leg members 21. Each of the leg members 16 has a receiving groove 22. The receiving groove 22 is positioned at an upper end 24 of the leg members 16. The receiving groove 22 is designed for receiving a ledge portion 26 of the sink section 16 of the table apparatus 12 for the purpose of preventing movement of the sink section 16 with regards to the base section 14 when the wet table saw is operated.

Each of the front leg members 20 has a slot portion 28. The slot portion 28 is located proximal the upper end 24 of the front leg members 20. The slot portions 28 are designed for receiving front ends 30 of lower wall members 32 of the base section 14.

Each of the front leg members 20 has a plurality of bores 34. The bores 34 are designed for receiving a plurality of coupling members 36. The coupling members 36 are designed for selectively coupling the front leg members 20 to the front ends 30 of the lower. wall members 32.

Each of the rear leg members 21 has a plurality of the slot portions 28. The slot portions 28 of the rear leg members 21 are located proximal the upper end 24 of the rear leg members 21. The slot portions 28 are oriented substantially transversely such that the slot portions 28 are designed for receiving back ends 38 of the lower wall members 32 of the base section 14, and outer ends 39 of a back lower wall member 40 of the base section 14.

Each of the rear leg members 21 has a plurality of bores 34. The bores 34 are designed for receiving a plurality of coupling members 36. The coupling members 36 are designed for selectively coupling the rear leg members 21 to the back ends 38 of the lower wall members 32 and the outer ends 39 of the back lower wall member 40 of the base section 14.

The sink section 16 of the table apparatus 12 is substantially rectangular. The sink section 16 has an outer rim 42. The outer rim 42 encompasses an outer perimeter 44 of the sink section 16. The outer rim 42 is designed for retaining liquid and debris from the wet table saw thereby ensuring that the liquid and debris remains in the sink section 16.

The sink section 16 has a catch surface 46. The catch surface 46 of the sink section 16 is substantially slanted downwardly towards the drain portion 18 of the sink section 16. The catch surface 46 is designed for biasing the liquid and debris from the wet table saw into the drain portion 18 of the sink section 16.

The drain portion 18 of the sink section 16 is centrally located in the sink section 16 such that the drain portion 18 is designed for allowing the liquid and debris from the wet table saw to exit the sink section 16.

The drain portion 18 has a catch basin member 48. The catch basin member 48 is located at a lowermost portion 50 of the drain portion 18 such that the catch basin member 48 is designed for preventing large particles from exiting the drain portion 18 of the sink section 16.

A bottom surface 52 of the sink section 16 has a plurality of ledge portions 26. The ledge portions 26 are positioned proximate outer edges 56 of the sink section 16. The ledge portions 26 are designed for being inserted into the grooves of the leg members 16 of the base section 14.

The splash section 15 of the table apparatus 12 comprises a plurality of upper wall members 58. The plurality of upper wall members 58 includes two upper side wall members 60 and a rear wall member 62. A rear end 64 of each of the upper side wall members 60 is selectively couplable to outer ends 39 of the rear wall members 62 such that the upper wall members 58 form a u-shape configuration.

The splash section 15 conforms to inside edges 68 of the outer rim 42 of the sink section 16 thereby allowing bottom edges 70 of the upper wall members 58 to rest on the catch surface 46 of the sink section 16 providing stability to the splash section 15 of the table apparatus 12.

The splash section 15 is designed for confining splashing of liquid and debris from the wet table saw to an area catchable by the sink section 16.

The table apparatus 12 includes a pump member 72. The pump member 72 is placeable in a liquid container 74. The pump member 72 is designed for forcing the liquid upwardly through a tube member 76 to the wet table saw for the purpose of cooling the wet table saw during the cutting process.

The liquid container 74 is positioned under the sink section 16 thereby catching the liquid for continuous recyclization.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An enclosed wet saw table for containing debris distributed by a wet type table saw, the enclosed wet saw table comprising:

a table apparatus, said table apparatus comprising a base section, a sink section, and a splash section, said base section of said table apparatus having a plurality of leg members, said leg members being adapted for supporting said table apparatus;

said sink section of said table apparatus being positioned atop said leg members, said sink section being adapted for capturing liquid and debris distributed from a wet table saw against said splash sections of said table apparatus and channeling the liquid and debris downwardly through a drain portion of said sink section when the wet table saw is placed and operated on said sink section of said table apparatus; and said plurality of leg members of said base section comprising front leg members and rear leg members, each of said leg members having a receiving groove, said receiving groove being positioned at an upper end of said leg members such that said receiving groove being adapted for receiving a ledge portion of said sink section of said table apparatus for the purpose of preventing movement of said sink section with regards to said base section when the wet table saw is operated.

2. The enclosed wet saw table as set forth in claim 1, further comprising:

each of said front leg members having a slot portion, said slot portion being located proximal said upper end of said front leg members, said slot portions being adapted for receiving a front end of a lower wall member of said base section;

each of said front leg members having a plurality of bores, said bores being adapted for receiving a plurality of coupling members, said coupling members being adapted for selectively coupling said front leg members to said front ends of said lower wall members.

3. The enclosed wet saw table as set forth in claim 2, further comprising:

each of said rear leg members having a plurality of said slot portions, said slot portions of said rear leg members being located proximal said upper end of said rear leg members, said slot portions being oriented substantially transversely such that said slot portions being adapted for receiving a back end of said lower walls of said base section and outer ends of a back lower wall of said base section; and each of said rear leg members having a plurality of bores, said bores being adapted for receiving a plurality of coupling members, said coupling members being adapted for selectively coupling said rear leg members to said back ends of said lower walls and said outer ends of said back lower wall of said base section.

4. The enclosed wet saw table as set forth in claim 1, further comprising:

said sink section of said table apparatus being substantially rectangular, said sink section having an outer rim, said outer rim encompassing an outer perimeter of said sink section, said outer rim being adapted for retaining debris from the wet table saw thereby ensuring that the debris remains in said sink section.

5. The enclosed wet saw table as set forth in claim 4, further comprising:

said sink section having a catch surface, said catch surface of said sink section being substantially slanted downwardly towards said drain portion of said sink section such that said catch surface being adapted for biasing the liquid and debris from the wet table saw into said drain portion of said sink section.

6. The enclosed wet saw table as set forth in claim 5, further comprising:

said drain portion of said sink section being centrally located in said sink section such that said drain portion being adapted for allowing the liquid and debris from the wet table saw to exit said sink section; and said drain portion having a catch basin member, said catch basin member being located at a lowermost portion of said drain portion such that said catch basin member being adapted for preventing large particles from exiting said drain portion of said sink section.

7. The enclosed wet saw table as set forth in claim 1, further comprising:

said ledge portions of said sink section being positioned on a bottom surface of said sink section proximate outer edges of said sink section, said ledge portions being adapted for being inserted into said grooves of said leg members of said base section.

8. The enclosed wet saw table as set forth in claim 6, further comprising:

said splash section of said table apparatus comprising a plurality of upper wall members, said plurality of upper wall members comprising two upper side wall members and a rear wall member, a rear end of each of said upper side wall members being selectively couplable to said outer ends of said rear wall members such that said upper wall members form a u-shape configuration;

said splash section conforming to inside edges of said outer rim of said sink section thereby allowing bottom edges of said upper wall members to rest on said catch surface of said sink section providing stability to said splash section of said table apparatus;

said splash, section being adapted for confining splashing of liquid and debris from the wet table saw to an area catchable by said sink section;

said table apparatus including a pump member, said pump member being placeable in a liquid container, said pump member being adapted for forcing the liquid upwardly through a tube member to said wet table saw for the purpose of cooking said wet table saw during the cutting process; and the liquid container is positioned under said sink section thereby catching the liquid for continuous recyclization.

9. An enclosed wet saw table for containing debris distributed by a wet type table saw, the enclosed wet saw table comprising:

a table apparatus, said table apparatus comprising a base section, a sink section, and a splash section, said base section of said table apparatus having a plurality of leg members, said leg members being adapted for supporting said table apparatus;

said sink section of said table apparatus being positioned atop said leg members, said sink section being adapted for capturing liquid and debris distributed from a wet table saw against said splash sections of said table apparatus and channeling the liquid and debris downwardly through a drain portion of said sink section when the wet table saw is placed and operated on said sink section of said table apparatus;

said sink section of said table apparatus being substantially rectangular, said sink section having an outer rim, said outer rim encompassing an outer perimeter of said sink section, said outer rim being adapted for retaining debris from the wet table saw thereby ensuring that the debris remains in said sink section;

said sink section having a catch surface, said catch surface of said sink section being substantially slanted downwardly towards said drain portion of said sink section such that said catch surface being adapted for biasing the liquid and debris from the wet table saw into said drain portion of said sink section;

said drain portion of said sink section being centrally located in said sink section such that said drain portion being adapted for allowing the liquid and debris from the wet table saw to exit said sink section;

said drain portion having a catch basin member, said catch basin member being located at a lowermost portion of said drain portion such that said catch basin member being adapted for preventing large particles from exiting said drain portion of said sink section;

said splash section of said table apparatus comprising a plurality of upper wall members, said plurality of upper wall members comprising two upper side wall members and a rear wall member, a rear end of each of said upper side wall members being selectively couplable to said outer ends of said rear wall members such that said upper wall members form a u-shape configuration;

said splash section conforming to inside edges of said outer rim of said sink section thereby allowing bottom edges of said upper wall members to rest on said catch surface of said sink section providing stability to said splash section of said table apparatus; and said splash section being adapted for confining splashing of liquid and debris from the wet table saw to an area catchable by said sink section.

10. The enclosed wet saw table as set forth in claim 9, further comprising:

said plurality of leg members of said base section comprising front leg members and rear leg members, each of said leg members having a receiving groove, said receiving groove being positioned at an upper end of said leg members such that said receiving groove being adapted for receiving a ledge portion of said sink section of said table apparatus for the purpose of preventing movement of said sink section with regards to said base section when the wet table saw is operated.

11. The enclosed wet saw table as set forth in claim 10, further comprising:

each of said front leg members having a slot portion, said slot portion being located proximal said upper end of said front leg members, said slot portions being adapted for receiving a front end of a lower wall member of said base section; and each of said front leg members having a plurality of bores, said bores being adapted for receiving a plurality of coupling members, said coupling members being adapted for selectively coupling said front leg members to said front ends of said lower wall members.

12. The enclosed wet saw table as set forth in claim 11, further comprising:

each of said rear leg members having a plurality of said slot portions, said slot portions of said rear leg members being located proximal said upper end of said rear leg members, said slot portions being oriented substantially transversely such that said slot portions being adapted for receiving a back end of said lower walls of said base section and outer ends of a back lower wall of said base section; and each of said rear leg members having a plurality of bores, said bores being adapted for receiving a plurality of coupling members, said coupling members being adapted for selectively coupling said rear leg members to said back ends of said lower walls and said outer ends of said back lower wall of said base section.

13. The enclosed wet saw table as set forth in claim 10, further comprising:

said ledge portions of said sink section being positioned on a bottom surface of said sink section proximate outer edges of said sink section, said ledge portions being adapted for being inserted into said grooves of said leg members of said base section.

14. The enclosed wet saw table as set forth in claim 9, further comprising:

said table apparatus including a pump member, said pump member being placeable in a liquid container, said pump member being adapted for forcing the liquid upwardly through a tube member to said wet table saw for the purpose of cooking said wet table saw during the cutting process; and the liquid container is positioned under said sink section thereby catching the liquid for continuous recyclization.

15. An enclosed wet saw table for containing debris distributed by a wet type table saw, the enclosed wet saw table comprising:

a table apparatus, said table apparatus comprising a base section, a sink section, and a splash section, said base section of said table apparatus having a plurality of leg members, said leg members being adapted for supporting said table apparatus;

said sink section of said table apparatus being positioned atop said leg members, said sink section being adapted for capturing liquid and debris distributed from a wet table saw against said splash sections of said table apparatus and channeling the liquid and debris downwardly through a drain portion of said sink section when the wet table saw is placed and operated on said sink section of said table apparatus;

said table apparatus including a pump member, said pump member being placeable in a liquid container, said pump member being adapted for forcing the liquid upwardly through a tube member to said wet table saw for the purpose of cooking said wet table saw during the cutting process; and the liquid container is positioned under said sink section thereby catching the liquid for continuous recyclization.

16. The enclosed wet saw table as set forth in claim 15, further comprising:

said plurality of leg members of said base section comprising front leg members and rear leg members, each of said leg members having a receiving groove, said receiving groove being positioned at an upper end of said leg members such that said receiving groove being adapted for receiving a ledge portion of said sink section of said table apparatus for the purpose of preventing movement of said sink section with regards to said base section when the wet table saw is operated;

each of said front leg members having a slot portion, said slot portion being located proximal said upper end of said front leg members, said slot portions being adapted for receiving a front end of a lower wall member of said base section;

each of said front leg members having a plurality of bores, said bores being adapted for receiving a plurality of coupling members, said coupling members being adapted for selectively coupling said front leg members to said front ends of said lower wall members;

each of said rear leg members having a plurality of said slot portions, said slot portions of said rear leg members being located proximal said upper end of said rear leg members, said slot portions being oriented substantially transversely such that said slot portions being adapted for receiving a back end of said lower walls of said base section and outer ends of a back lower wall of said base section; and each of said rear leg members having a plurality of bores, said bores being adapted for receiving a plurality of coupling members, said coupling members being adapted for selectively coupling said rear leg members to said back ends of said lower walls and said outer ends of said back lower wall of said base section.

17. The enclosed wet saw table as set forth in claim 15, further comprising:

said sink section of said table apparatus being substantially rectangular, said sink section having an outer rim, said outer rim encompassing an outer perimeter of said sink section, said outer rim being adapted for retaining debris from the wet table saw thereby ensuring that the debris remains in said sink section;

said sink section having a catch surface, said catch surface of said sink section being substantially slanted downwardly towards said drain portion of said sink section such that said catch surface being adapted for biasing the liquid and debris from the wet table saw into said drain portion of said sink section;

said drain portion of said sink section being centrally located in said sink section such that said drain portion being adapted for allowing the liquid and debris from the wet table saw to exit said sink section; and said drain portion having a catch basin member, said catch basin member being located at a lowermost portion of said drain portion such that said catch basin member being adapted for preventing large particles from exiting said drain portion of said sink section.

18. The enclosed wet saw table as set forth in claim 16, further comprising:

said ledge portions of said sink section being positioned on a bottom surface of said sink section proximate outer edges of said sink section, said ledge portions being adapted for being inserted into said grooves of said leg members of said base section.

19. The enclosed wet saw table as set forth in claim 17, further comprising:

said splash section of said table apparatus comprising a plurality of upper wall members, said plurality of upper wall members comprising two upper side wall members and a rear wall member, a rear end of each of said upper side wall members being selectively couplable to said outer ends of said rear wall members such that said upper wall members form a u-shape configuration;

said splash section conforming to inside edges of said outer rim of said sink section thereby allowing bottom edges of said upper wall members to rest on said catch surface of said sink section providing stability to said splash section of said table apparatus; and said splash section being adapted for confining splashing of liquid and debris from the wet table saw to an area catchable by said sink section.

* * * * *